No. 629,097. Patented July 18, 1899.
W. J. STEWART.
CREAM PASTEURIZING MACHINE.
(Application filed Sept. 10, 1897.)
(No Model.) 3 Sheets—Sheet 1.
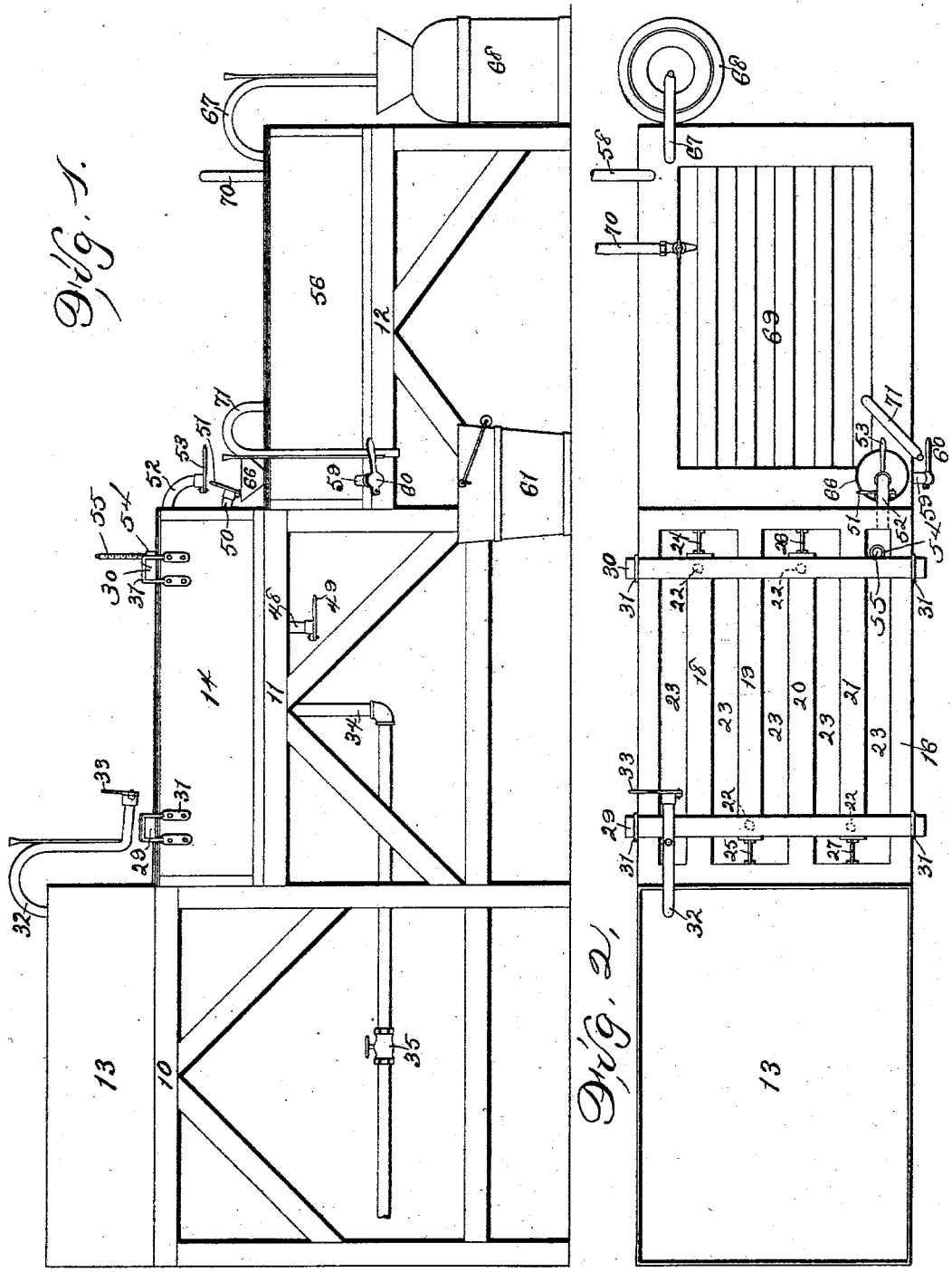

No. 629,097. Patented July 18, 1899.
W. J. STEWART.
CREAM PASTEURIZING MACHINE.
(Application filed Sept. 10, 1897.)

(No Model.) 3 Sheets—Sheet 2.

Attest:
W. J. Sankey
R. G. Orwig

Inventor:
William J. Stewart,
by J. G. Sweet
Atty

No. 629,097. Patented July 18, 1899.
W. J. STEWART.
CREAM PASTEURIZING MACHINE.
(Application filed Sept. 10, 1897.)
(No Model.) 3 Sheets—Sheet 3.
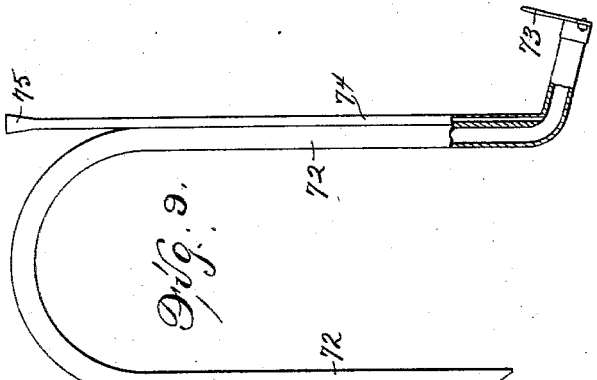
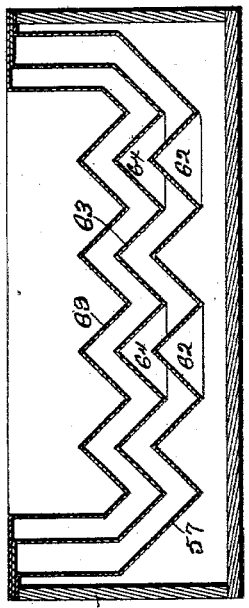
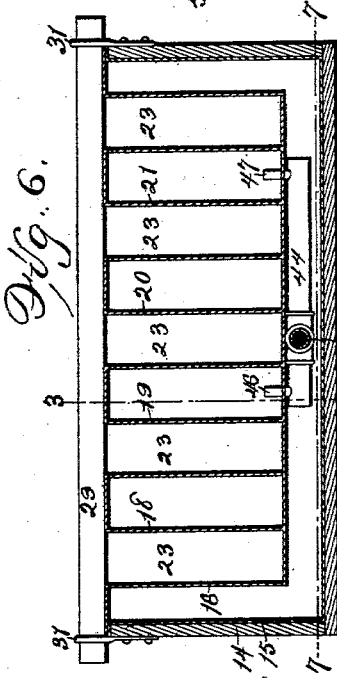
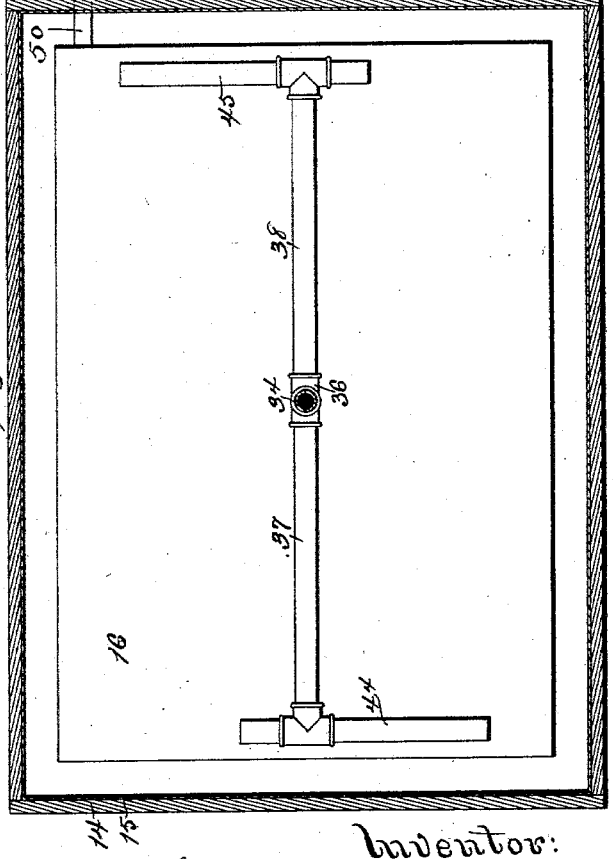
Attest:
W. J. Sankey.
R. G. Orwig.
Inventor:
William J. Stewart.
by J. H. Sweet
Att'y

UNITED STATES PATENT OFFICE.

WILLIAM J. STEWART, OF GRIMES, IOWA.

CREAM-PASTEURIZING MACHINE.

SPECIFICATION forming part of Letters Patent No. 629,097, dated July 18, 1899.

Application filed September 10, 1897. Serial No. 651,192. (No model.)

*To all whom it may concern:*

Be it known that I, WILLIAM J. STEWART, a citizen of the United States of America, and a resident of Grimes, in the county of Polk and State of Iowa, have invented a new and useful Cream-Pasteurizing Machine, of which the following is a specification.

The object of this invention is to provide improved means for pasteurizing cream, milk, or similar substances to the end that the germs contained therein at the time of treatment may be killed and the substance so changed as that it will cultivate germs very slowly and thus keep the substance in a sweet, palatable condition for use for a considerable period of time without in any manner altering the appearance of the substance or its natural consistency.

My invention consists in the construction, arrangement, and combination of elements hereinafter set forth, pointed out in my claims, and illustrated by the accompanying drawings, in which—

Figure 3:
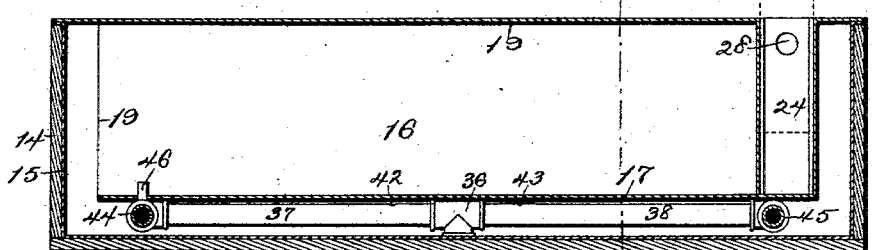
Figure 4:
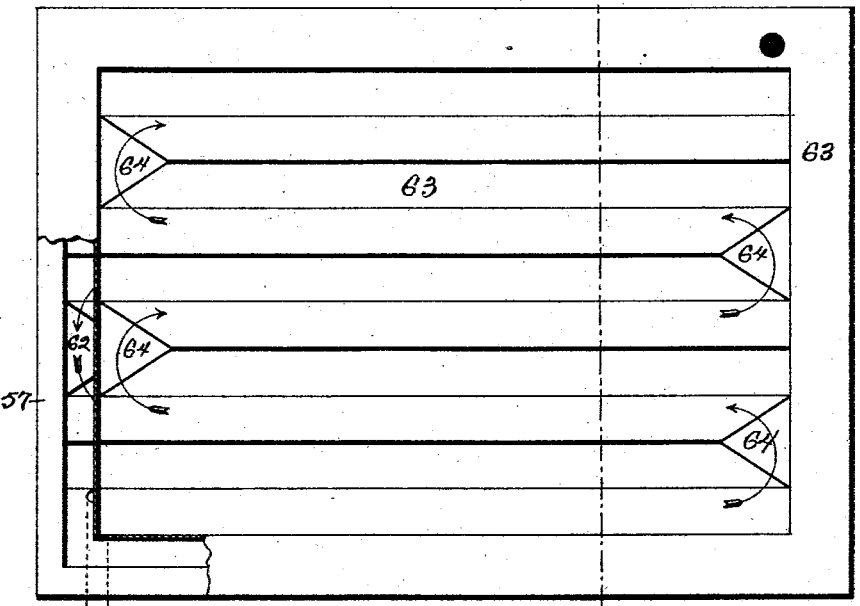
Figure 5:
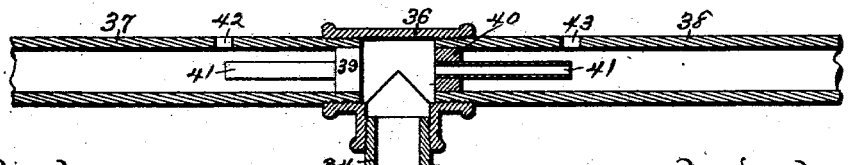

Figure 1 is a side elevation of the complete apparatus. Fig. 2 is a plan of the complete apparatus. Fig. 3 is a longitudinal sectional elevation, on an enlarged scale, of the heating-tank of the apparatus. Fig. 4 is a plan, partly in section, of the cooling portion of the apparatus, one of the water-tanks being removed. Fig. 5 is a detail sectional view of one of the steam-pipes employed in the apparatus to supply steam to the heating-tank. Fig. 6 is a transverse sectional elevation of the heating-tank on the indicated line 6 6 of Fig. 3. Fig. 7 is an inverted plan, partly in section, of the heating-tank on the indicated line 7 7 of Fig. 6. Fig. 8 is a transverse sectional elevation of the cooling-tank on the indicated line 8 8 of Fig. 4. Fig. 9 is a detail elevation, partly in section, of one of the siphons employed in my apparatus.

In the construction of the apparatus, as shown, a frame is provided with three tables 10, 11, and 12, forming the top thereof and located at different or graduated elevations, the lower table 12 being at a material distance above the floor, for a purpose that hereinafter will be made plain. Located on the higher table 10 is an initial tank 13, which may be of any desired construction, but will serve the purpose equally well of any construction whereby it may be made to contain a sufficient quantity of cream, milk, or other substance to be treated. Located on the middle table 11 is the heating-tank, having its top or upper margin in a plane coincident with or below the horizontal plane of the bottom of the initial tank 13. The heating-tank comprises a receptacle or tank 14, of wood, which is provided with a metallic lining 15, formed with a marginal flange overlapping and resting upon the top edges of its sides, rendering the said tank imperforate on its sides and bottom and adapting the same to contain water. Located within the tank 14 is a cream-receptacle 16, also provided with a marginal flange extending over and resting upon the marginal flange of the lining of the tank 14. The cream-receptacle 16 is formed with a bottom 17 and a series of flues 18, 19, 20, and 21, opening by means of ports 22 (dotted lines, Fig. 2) through said bottom and opening at their ends through the opposite end portions of the tank 16, the opening at the ends of the flues 18 and 20 being through the opposite end of the tank from the opening at the ends of the flues 19 and 21. The flues 18 and 20 are stopped short of and closed at their ends near one end portion of the tank 16, and the flues 19 21 are stopped short of and have their ends closed near the opposite end portion of said tank, thus providing spaces between the ends of the flues and the adjacent end portions of the tank, whereby a sinuous channel 23 is formed within the tank. The flues 18, 19, 20, and 21 are approximately of the same height as the depth of the tank 16, and gates 24, 25, 26, and 27 are mounted in slide-bearings formed on the ends of the flues and the adjacent ends of the tank and are arranged for vertical reciprocation therein for the purpose or with the function of cutting off the flow of substance through the sinuous channel 23. All of the gates are of the same construction as the gate 24, Fig. 3, and are provided with apertures or ports 28 in their upper end portions, through which ports the substance may flow from one side of the gate to the other when said gates all are seated and the cream-receptacle 16 is nearly filled. The cream-receptacle 16 is held down and confined in the tank 14 by cross-bars 29 30 engaging beneath shackles or loops 31, fixed to and upwardly extending from the sides of the tank 14. One corner of the tank or receptacle 16 is raised slightly relative to the diagonally opposite corner of said receptacle, and a siphon 32 leads from the adjacent corner of the initial tank 13 at said higher corner of the tank 16. The siphon 32 is provided with a gate or valve 33, whereby the flow from the initial tank 13 to the initial end of the channel 23 is regulated and controlled. There is a space between the sides, ends, and bottom of the cream-receptacle 16 and the inner surface of the lining 15 of the tank 14, and the steam-supply pipe 34, provided with a cut-off valve 35, leads from the source of steam-supply (not shown) to and discharges within said space. The steam-pipe 34 is connected to a T 36, located between the bottom of the tank 16 and the bottom of the tank-lining 15, and said T is provided with lateral branches 37 38, screwed therein, and plugs 39 40, seated in the ends of the branches adjacent to the T. Each of the plugs 39 40 is provided with a discharge-pipe 41, centrally located in the branches 37 38, and near the outer ends of the discharge-pipes apertures 42 43 are formed in the upper portions of the branches. The ends of the branches 37 38 opposite to the T are provided with lateral branches 44 45, closed at their ends, and nipples 46 47 on the lateral branches 44 45 extend upwardly through the ports 22 into the flues 18, 19, 20, and 21. A drain-pipe 48, provided with a valve 49, is located in the bottom of the tank 14 and provides means for draining said tank. A drainage-pipe 50, provided with a valve 51, is located in and traverses the ends of the tank 14 and the receptacle 16 at the discharge end of the channel 23 and at the bottom of said channel, whereby means is provided for draining the cream-receptacle 16. A discharge-pipe 52 is mounted in and traverses the ends of the tank 14 and cream-receptacle 16 immediately above the drainage-pipe 50 and is provided with a valve 53. The discharge-pipe 52 communicates with the discharge end of the channel 23 on a plane common to the ports 28 in the gates 24, 25, 26, and 27 and provides means for discharging the cream from the tank or receptacle 16 uniformly with its supply to said tank and the flow thereof through the said ports. A socket 54 is fixed to the cross-bar 30 immediately above the discharge end of the channel 23, and a thermometer 55 is mounted in said socket and depends with its bulb in the substance in said channel. Other sockets may be provided at different points and contain other thermometers, whereby to determine the temperature of the substance contained in the cream tank or receptacle at all times. Mounted upon the lower table 12 of the frame is the cooling-tank, which comprises an outer receptacle 56, preferably of wood. Located in the receptacle 56 is a water-tank 57, having parallel plane end portions and a corrugated or fluted bottom and marginal flanges arranged and so shaped as to engage over and rest upon the upper edges of the receptacle 56. The water-tank 57 is provided with a supply-pipe 58, where water is supplied thereto at one corner, and a discharge-pipe 59 at the corner diagonally opposite thereto and provided with a gate or valve 60. By maintaining a constant supply of water through the pipe 58 and opening the discharge-pipe 59 to the desired extent a continuous flow of water may be maintained within and through the water-tank 57 into a pail or other waste-receptacle 61, provided therefor. The fluted or corrugated portions of the bottom of the water-tank 57 are depressed in staggered relations at opposite ends, forming cross-channels 62, Figs. 4 and 8, thereby forming a continuous water-channel from the supply-pipe 58 to the discharge-pipe 59, through which water may flow without overflowing the apexes of the corrugated portions. A cream-tank 63, with plane parallel end portions and a corrugated bottom corresponding with the corrugated bottom of the water-tank 57 in cross-section, is provided and is formed with marginal flanges arranged and so shaped as to engage above and rest upon the marginal flanges of the water-tank. The corrugations of the bottom of the cream-tank 63 are depressed at their opposite end portions in staggered relations to each other and form cross-channels 64, whereby a continuous channel is formed from one end of said corrugations to the opposite end of the extremely opposite corrugation of said tank. A funnel 66 is located near one corner of the tank 63 immediately adjacent to the discharge-pipe 59 of the water-tank and at the initial end of the cream-channel of said cream-tank. The funnel 66 is located immediately below the drain-pipe 50 and discharge-pipe 52 of the heating-tank. A siphon 67 is located with its initial end in the corner of the cream-tank diagonally opposite to the funnel 66, and consequently in the discharge end of the cream-channel in said tank, and the discharge end of said funnel is located in or above the cream-can 68 or other receptacle provided therefor. A water-tank 69 is provided with plane parallel ends and the corrugated bottom corresponding in cross-section with the corrugated bottom of the cream-tank 63 and marginal flanges so shaped and arranged as to engage above and rest upon the marginal flanges of the cream-tank, and said water-tank is open at its top. A supply-pipe 70 discharges water into the tank 69 adjacent to the siphon 67, and a siphon 71 draws the water from the tank 69 adjacent to the funnel 66 and discharges the same into the pail or other receptacle 61 provided therefor. The siphons heretofore mentioned are alike in construction and comprise the curved tube 72, having a shorter leg with a notched lower end arranged to rest upon the bottom of the receptacle from which it is desired that liquid be drawn and a longer leg arranged to depend outside the receptacle and provided at its discharge-port with a gate 73, whereby the flow of said liquid through said siphon may be regulated and controlled. A branch pipe communicates at its lower end with the longer leg of the siphon-tube 72 below the plane of the initial opening of the said siphon-tube and extending upwardly therefrom and is provided with a mouthpiece or portion 75, through which a current of air may be established in the siphon, tending to create a vacuum in the siphon-tube and establish a flow of liquid therethrough.

In the proper use of the apparatus above described I fill the initial tank 13 with cream as it comes from the separator, diluted to any desired degree, and establish a flow therefrom through the siphon 32 into the initial end of the channel 23 in the heating-tank. I fill the tank 14 nearly full of water around the tubes of and the tank 16 and heat said water by the inflow of steam through the pipe 34 and its branches. The steam flowing through the pipe 34 enters the T 36 and from thence is discharged laterally through the pipes 41 and in its discharge tends to create a vacuum in the inner portions of the branches 37 38, which vacuum is supplied by water flowing into the branches through the ports 42 43, and the combined steam and water thereby heated is carried to and discharged through the nipples 46 47 into the flues 18, 19, 20, and 21 and discharges through the open ends of the flues into the space between the ends of the tank 16 and the adjacent ends of the tank 14, thereby establishing and maintaining a continuous flow and circulation of heated water and steam through the tank around and about and through the flues. Since the portions of the tank 16 between the flues form a channel through which the cream from the siphon 32 constantly flows, it follows that the cream in said channel is paralleled by a like or similar quantity of heated water constantly in motion and continuously replenished, which quantity of water tends to raise the temperature of the cream in the tank to the desired degree, and the temperature of the cream is determined by reading the thermometers carried on the cross-bars. After the tank 16 has filled with cream I position the gates 24, 25, 26, and 27 as shown by solid lines in Fig. 3 and open the discharge-pipe 52 to such an extent as to permit the flow therethrough of such a quantity of cream as may flow through the siphon 32 and the ports 28 in the gates. Experiment in the use of this device has demonstrated that the temperature of the cream at the top of the tank is 10° Fahrenheit higher than the temperature thereof at the bottom of the tank, and by the use of the gates having ports near their upper ends and the employment of the discharge-pipe 62, leading from approximately the plane in which the ports are located, I am enabled to draw the cream of higher temperature from the tank at times. I maintain the temperature of the cream in the upper portion of the tank 16 at about 160° Fahrenheit, at which point I have demonstrated that the cream does not scald or taint and at the same time it gives off offensive effluvia, which may arise from the containing therein of milk or cream produced from vegetables or feed gathered by the cow indiscriminately and which it is desirable to eliminate from the preserved cream. I discharge the heated cream through the discharge end of the channel 23, through the funnel 66, into the cream-tank 63 and cause said cream to flow through the sinuous continuous channel in the corrugated bottom thereof to a point of discharge through the siphon 67 into a can or other receptacle 68, in which it is soldered and deep set in water-tanks or put in cold storage for future use. During the time that the cream is flowing through the tank 63 it is paralleled on both sides by cold water flowing in the opposite direction from the points of supply 58 70 to the points of discharge 59 71, and by keeping up a constant flow of water through the water-tanks 57 69 I am enabled rapidly to reduce the temperature of the cream to the degree desired. It is this process of first heating the cream to destroy the germs therein and then carrying the cream and maintaining the same in a cool condition at approximately 40° Fahrenheit that commonly is termed "pasteurizing," and by its use all the germs of the cream are destroyed and said cream is put into a condition where it germinates slowly and may be preserved for a considerable period of time in a sweet, fresh, palatable, and usable condition.

I claim as my invention—

1. A pasteurizing-machine comprising the initial tank, the heating-tank communicating with the initial tank and comprising a water-receptacle, a cream-tank mounted in the water-receptacle and formed with a sinuous cream-channel open at its top and receiving cream from the initial tank at one end, steam-flues within the cream-tank and extending from one end thereof nearly to the other end and alternately staggered, which flues are open at one end the full height thereof into the receptacle and closed at the other end, a plane bottom the full width and length of the cream-tank and provided with apertures communicating with the closed ends of the steam-flues and gates removably and replaceably mounted between the closed ends of the steam-flues and the adjacent end of the cream-tank and provided with ports in their upper end portions, steam-pipes in the receptacle below the cream-tank and extended within the steam-flues, a pipe leading from the discharge end of the cream-channel, and a cooling-tank communicating with said discharge-pipe.

2. A pasturizing-machine comprising the initial tank, the heating-tank communicating therewith and the cooling-tank communicating with the heating-tank and comprising three removable and replaceable nested receptacles, the outermost and innermost receptacles being arranged to receive water and the intermediate receptacle being arranged to receive cream running in contact with the innermost water-receptacle and contacted by the water in the lower receptacle.

3. A heating-tank comprising a receptacle for hot water, a steam-pipe communicating therewith, a receptacle having a continuous channel through which cream may flow, flues forming the aforesaid continuous channel and communicating with the hot-water tank and steam-pipe, and gates removably and replaceably mounted and provided with apertures near their upper ends whereby the flow of cream through the countinuous channel is governed and controlled.

4. In a cooling-tank a water-tank having a corrugated bottom forming a continuous channel, a cream-tank having a corrugated bottom forming a continuous channel and nested in the water-tank, the lowest points of the cream-tank entering the corrugations of the bottom of the water-tank, a water-tank having a corrugated bottom nested in the cream-tank and means for supplying to and discharging from the tanks the fluid substances to be contained therein.

5. In a cooling-tank a water-tank provided with supply and discharge pipes located on opposite sides thereof, a removable and replaceable cream-tank located within the water-tank and provided with supply and discharge means located on opposite sides thereof, and a removable and replaceable water-tank located within the cream-tank and provided with supply and discharge means located on opposite sides thereof, which latter water-tank is separable from the cream-tank independently of the removal of the cream-tank from the first water-tank, the cream within the cream-tank being located between the water-tanks.

6. In a cream-pasteurizing machine, a tank having a continuous, sinuous channel through which the cream may flow, which channel is of materially greater depth than its width, and flues parallel with said channel, which flues are approximately the same height as the depth of the channel, whereby the cream is caused to flow in a comparatively thin body between similar bodies of water or steam of a temperature different from the initial temperature of the cream together with gates apertured at their upper ends and mounted removably and replaceably in said channel.

WILLIAM J. STEWART.

Witnesses:
S. C. SWEET,
THOMAS G. ORWIG.